United States Patent [19]

Matsushita

[11] Patent Number: 4,590,484

[45] Date of Patent: May 20, 1986

[54] THERMAL RECORDING HEAD DRIVING CONTROL SYSTEM

[75] Inventor: Yoh Matsushita, Yokohama, Japan

[73] Assignee: Ricoh Company, Ltd., Japan

[21] Appl. No.: 570,303

[22] Filed: Jan. 13, 1984

[30] Foreign Application Priority Data

Jan. 13, 1983 [JP] Japan .................................... 58-2820
May 31, 1983 [JP] Japan .................................. 58-96285
May 31, 1983 [JP] Japan .................................. 58-96287

[51] Int. Cl.[4] ........................ G01D 15/10; H05B 3/00
[52] U.S. Cl. ................................ 346/76 PH; 219/216
[58] Field of Search .................... 346/76 PH; 219/216

[56] References Cited

U.S. PATENT DOCUMENTS 3,577,137 5/1971 Brennan, Jr. .................. 346/76 PH
4,369,452 1/1983 Anno et al. .................... 346/76 PH

FOREIGN PATENT DOCUMENTS 57-15986 1/1982 Japan ............................. 346/76 PH

*Primary Examiner*—George H. Miller, Jr.
*Attorney, Agent, or Firm*—Guy W. Shoup

[57] ABSTRACT

A thermal recording head driving control system for controlling the activation of heat-producing elements mounted on a substrate is provided. The driving control system includes a shift register having a number of bits corresponding to the heat-producing elements. The image data stored in the shift register is serially supplied to one input terminal of an AND gate which has its the other input terminal connected to receive a control pulse and its output terminal connected to supply an activation pulse to the thermal recording head. The activation pulse is formed from the image signal depending upon the condition of the control pulse which is determined by the temperature of the substrate on which the heat-producing elements are mounted and the activation history of each of the heat-producing elements. Specifically, the same image data is repetitively supplied to the shift register over a predetermined number of times at a speed much faster than the line scanning speed along the linear array of heat-producing elements, wherein the number of activation pulses produced is controlled by changing the binary state of the control pulse.

13 Claims, 16 Drawing Figures

100
180
VHD
LOAD
2048
184
182
186
18
146
108
126
124
106
DIN CK QA QB
ROM
116
118
10
RAMB
104
RAMA
102
RAMCNT
110
112
114
138
136
134
140
141
142
122
120
130
132
IADD
OADD
TOGGLE BUFFER CONTROL
IDATA
WENA
ELCLK
CNTCLK
CNTENA
CNTLOAD
THERM
MPXCK

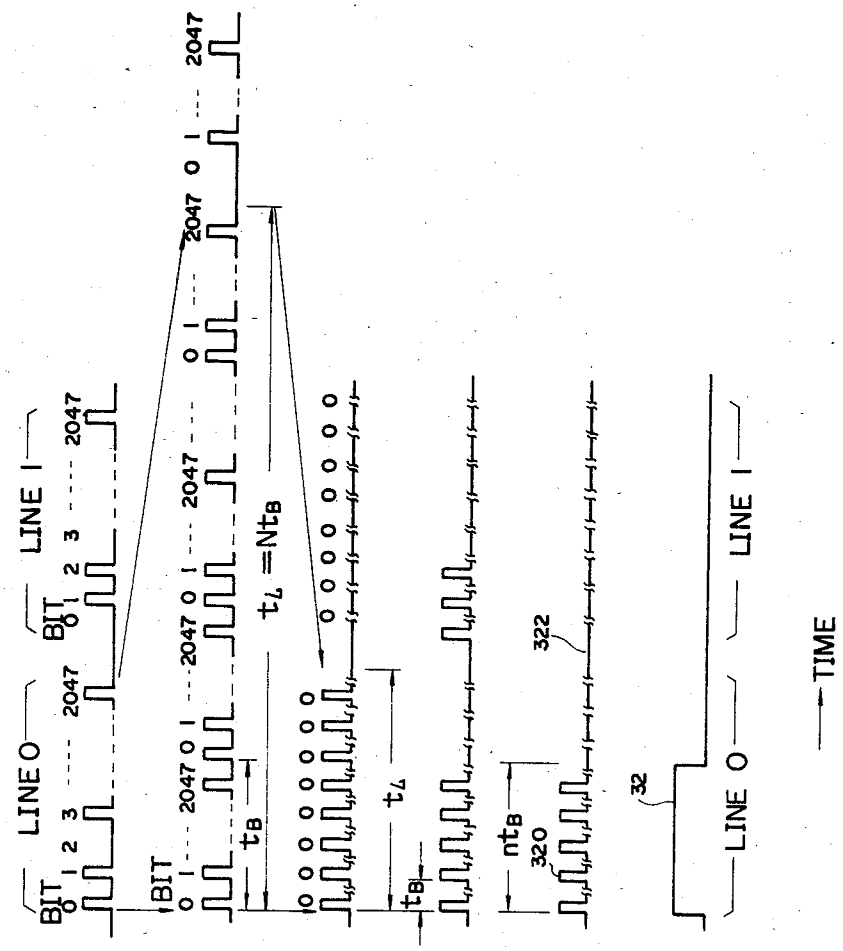
Fig.6(A) IDATA 120
Fig.6(B) SHIFT REGISTER 106 INPUT 122
Fig.6(C) AND 108 INPUT 124
Fig.6(D) AND 108 INPUT 126
Fig.6(E) SHIFT REGISTER 182 INPUT 146
Fig.6(F) TRANSISTOR 186

THERMAL RECORDING HEAD DRIVING CONTROL SYSTEM

BACKGROUND OF THE INVENTION

1. Field of the Invention

This invention generally relates to thermal recording and particularly to a system for controlling the operation of a thermal recording head for recording image information on a recording medium. More in particular, the present invention relates to a thermal recording head driving control system for controlling the operation of each of a plurality of heat-producing elements arranged in the form of a linear array in a recording head, thereby controlling the level of heat produced by each of the heat-producing elements to allow to obtain a recorded image of excellent quality at all times.

2. Description of the Prior Art

In thermal recording, use is made of a thermal recording head provided with at least one heat-producing element such as an electrical resistor, whose activation is controlled in accordance with an image data whereby the resulting heat is used to record an image on a recording medium. In one form of such thermal recording, use is made of an inked ribbon which is placed sandwiched between the recording head and the recording medium, normally plain paper, so that ink is transferred to the recording medium when partly melted due to application of heat to form a recorded image thereon. In another form, instead of using an inked ribbon, thermosensitive paper is used as a recording medium and the heat produced by the recording head is directly applied to the paper to form a recorded image thereon. In such thermal recording techniques, the thermal recording head normally includes a linear array of heat-producing elements which are arranged side-by-side at a predetermined pitch and the recording medium is moved in the direction perpendicular to the longitudinal direction of the linear array. In this case, as is well-known for one skilled in the art, the longitudinal direction of the linear array is called the main scanning direction and the direction normal to the main scanning direction, which is the direction along which the recording medium advances, is called the auxiliary direction.

In such thermal recording, the density of an image recorded on a recording medium fluctuates depending upon various factors, among which the inter-activation time period, i.e., time period between two consecutive activations of a heat-producing element, becomes predominantly important if high-speed recording is desired, which is often the case. That is, when one of the heat-producing elements is selectively activated thereby being heated to or above a predetermined temperature level, a dot of image is recorded on the recording medium, and, then, the temperature of the thus heated element decreases exponentially to a base level, normally room temperature. Since it takes time for the heat-producing element to return to the base level, if the following activation of the same heat-producing element takes place too soon, then the recorded dot of image will be higher in density than the previously recorded dot of image, thereby causing fluctuations in image density. It is thus necessary to provide a sufficiently long waiting time period between the two successive recordings in order to avoid such density fluctuations, or to provide a means for causing the heat-producing element to cool down to the base level in an accelerated manner. In either case, the recording speed is rather limited.

Several proposals have been made to cope with the above-described problems, and they include Japanese Patent Laid-Open Publications, Nos. 55-142675 and 52-55831 and Japanese Patent Publication for Oppositions, No. 55-47980. However, none of them is satisfactory and there has been a need to develop an improved system for controlling the activation of heat-producing element in a thermal recording head.

SUMMARY OF THE INVENTION

It is therefore a primary object of the present invention to provide an improved thermal recording head driving control system.

Another object of the present invention is to provide a thermal recording head driving control system which allows to obtain recorded images of excellent quality at all times.

A further object of the present invention is to provide a thermal recording head driving control system capable of thermally recording an image at high speed without causing fluctuations in density.

A still further object of the present invention is to provide a thermal recording system capable of forming a thermally recorded image of intended density without being adversely affected by the pattern of image or inter-activation time period.

Other objects, advantages and novel features of the present invention will become apparent from the following detailed description of the invention when considered in conjunction with the accompanying drawings.

BRIEF DESCRIPTION OF THE DRAWINGS

FIGS. 6(A)–6(F) are timing charts which are useful for understanding the operation of the system shown in FIG. 5;

DESCRIPTION OF THE PREFERRED EMBODIMENTS

Figure 1:
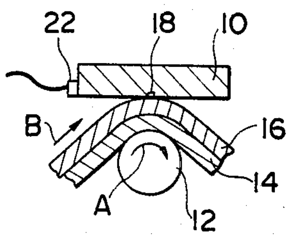
FIG. 1 is a fragmentary, schematic illustration showing the transfer type thermal recording apparatus to which the present invention may be advantageously applied.

Referring now to FIG. 1, there is schematically shown the transfer type thermal recording apparatus to which the present invention may be advantageously applied. The transfer type thermal recording apparatus includes a thermal recording head 10 and a platen roller 12 which is driven to rotate in the direction indicated by the arrow A. A recording medium 14, such as plain paper, on which is placed an inked sheet 16, is sandwiched between the thermal recording head 10 and the platen roller 12 under pressure so that the recording medium 14, together with the inked sheet 16, advances in the direction indicated by the arrow B as driven by the platen roller 12. The thermal recording head 10 comprises a substrate and at least one heat-producing element 18 supported by the substrate 10. In the present embodiment, the thermal recording head 10 includes a plurality of such heat-producing elements which are arranged side-by-side spaced apart one from another at a predetermined pitch to define a linear array extending in the direction generally perpendicular to the direction of advancement of the recording medium 14. Thus, the longitudinal direction of such linear array defines the main scanning direction and the direction B along which the recording medium 14 advances defines the auxiliary scanning direction. Typically, the heat-producing element 18 is comprised of an electrical resistor and an activation energy to be applied to the element 18 is electric current. However, the activation energy may take any other appropriate form.

Figure 5:
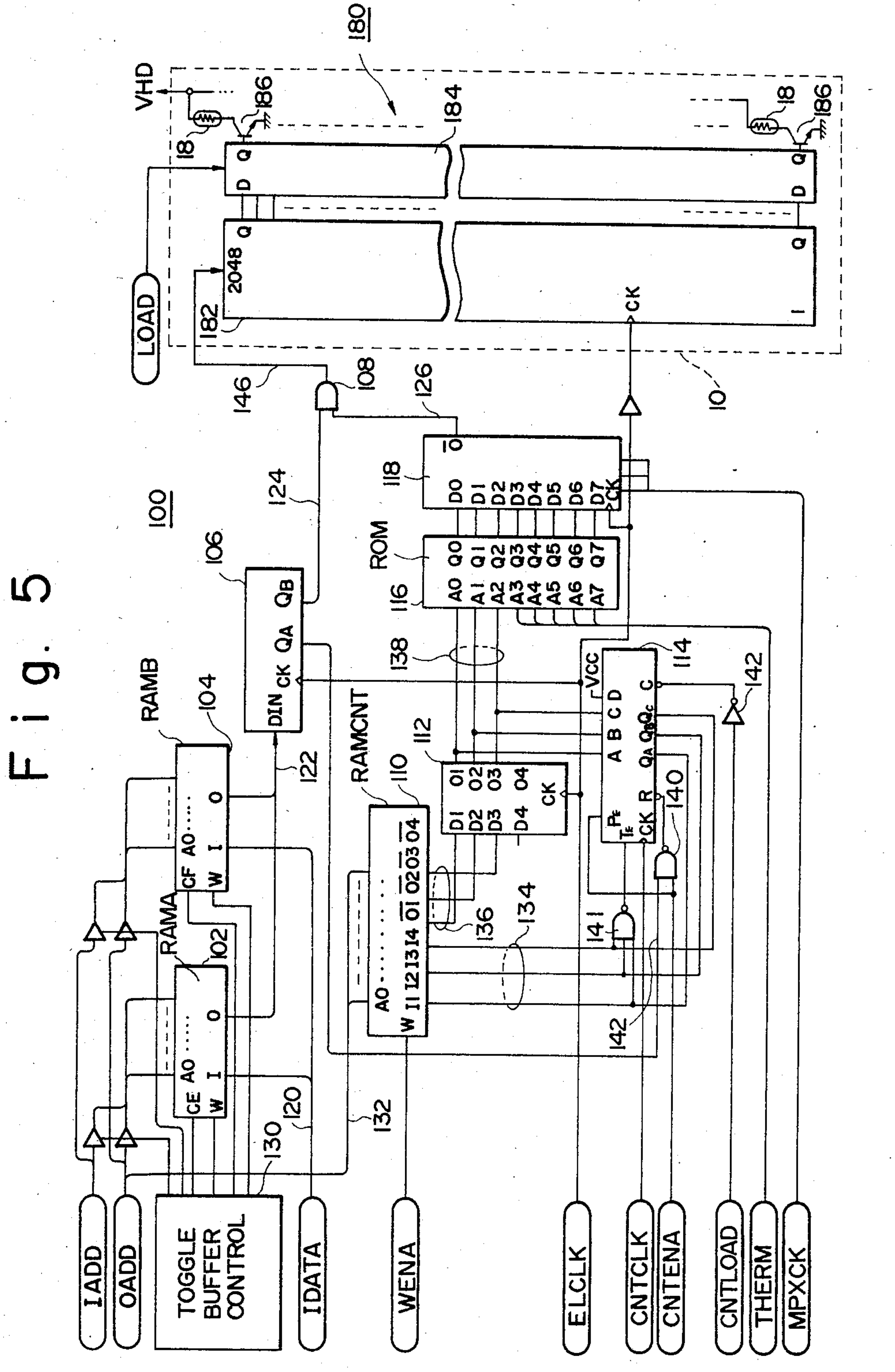
FIG. 5 is a schematic illustration showing the thermal recording head driving control system constructed in accordance with one embodiment of the present invention.

It is to be noted that the linear array of heat-producing elements 18 is long enough to extend across the width of the recording medium 14 so that a dot pattern along a horizontal line may be recorded when the linear array is scanned from one end to the other. The detailed structure of such a linear array is shown in FIG. 5 generally indicated as reference numeral 10. Thus, as the platen roller 12 is driven to rotate in the direction indicated by A, the recording medium 14, together with the inked sheet 16 in contact with the recording medium 14, advances in the auxiliary scanning direction indicated by B, wherein the linear array of heat-producing elements 18 is line-scanned repetitively with image data so that the heat-producing elements 18 are selectively activated thereby applying a heat pattern commensurate with the image data to the inked sheet 16 thereby causing a pattern of ink to be transferred and fixed to the recording medium 14. In this case, the activation energy to be applied to each of the elements 18 (mJ/dot) must be maintained in a predetermined range. Otherwise, the size of a recorded dot will be too large whereby the two adjacent dots become merged in an extreme case, or it will be too small and some image information may be lost.

Figure 2:
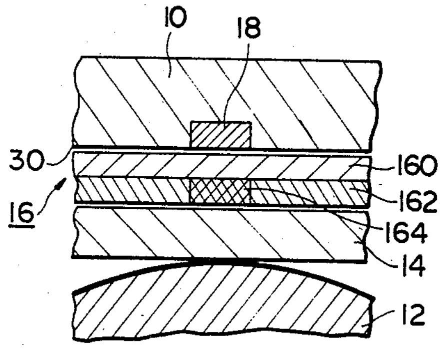
FIG. 2 is a schematic illustration showing in detail the structure of imaging region of the apparatus shown in FIG. 2.

FIG. 2 shows the detailed structure of the image transfer region in the transfer type thermal recording apparatus. As shown, the inked sheet 16 comprises a base 160 and an ink layer 162 supported on the base 160. The inked sheet 16 is placed in contact with the recording medium 14 with the ink layer 162 facing the recording medium 14. When the heat-producing element 18 is activated, a part of the ink layer 162, which is indicated by a double-hatched region 164, is heated to or above the melting point of ink so that the region 14, in effect, becomes transferred and affixed to the recording medium 14. However, the heat produced by the heat-producing element 18 when activated is also dissipated through various other thermal resistances in part to the remaining portion of the ink layer 162, to the substrate 10 and to the surrounding atmosphere.

Figure 3:
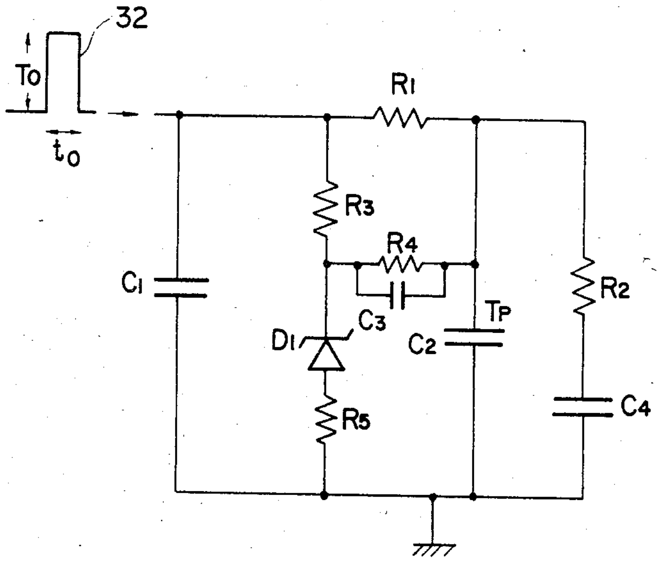
FIG. 3 is a circuit diagram which is functionally equivalent to the structure shown in FIG. 2.

FIG. 3 shows an equivalent circuit diagram which is constructed on the basis of the physical structure shown in FIG. 2. In FIG. 3, each of the parameters shown has the following meaning.

$C_1$: thermal capacity of heat-producing element 18.
$C_2$: thermal capacity of substrate 10.
$C_3$: thermal capacity required to increase the temperature of region 164 to be transferred to the melting point.
$C_4$: thermal capacity of the surrounding atmosphere.
$R_1$: thermal resistance between heat-producing element 18 and substrate (including a heat releasing plate if provided) 10.
$R_2$: thermal resistance between substrate 10 and the surrounding atmosphere.
$R_3$: thermal resistance between heat-producing element 18 and ink layer 162 through air gap 30 and base 160.
$R_4$: thermal resistance for the heat leakage from heat-producing element 18 to substrate 10 and to platen 12 through air gap 30 and inked sheet 16.
$R_5$: thermal resistance for the heat absorbed by ink region 164 to be transferred.
$D_1$: Zener diode indicating the melting point.
$T_p$: temperature of substrate 10 due to stored heat.

In the equivalent circuit diagram shown in FIG. 3, $C_2$ is larger than $C_1$ and temperature $T_p$ due to thermal capacity $C_2$ may be considered substantially at constant in the frame of reference of activation frequency of heat-producing element 18. Moreover, $R_3$ is significantly larger than $R_1$. As a result, temperature T of thermal capacitor $C_1$ at time t after having been heated to $T_0$ may be approximately expressed by the following equation (1).

$$T \cong T_p + (T_0 - T_p) \exp\left(-t\frac{1}{C_1R_1}\right) \quad (1)$$

Since the energy required to melt the ink region 164 is significantly larger than the energy required to increase a unit amount of ink by the temperature equivalent to 1° C., the energy stored in $C_3$ until it reaches the melting point may be neglected as compared with the energy required for ink transfer in a temperature range of practical interest.

Figure 4:
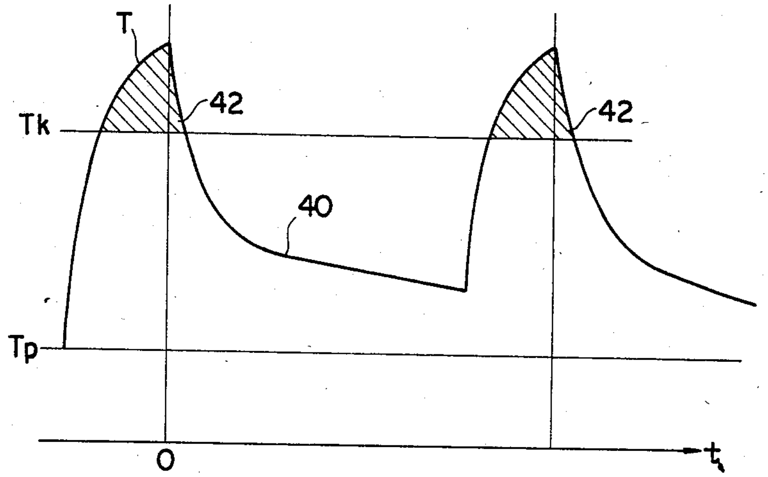
FIG. 4 is a graph showing how the temperature of a heat-producing element of thermal recording head varies with time.

The melting point $T_k$ of ink is much higher than $T_p$. Considering that the inked sheet 16 moves during recording, the temperature of heat-producing element 18 which contributes to melting of ink is that portion of the temperature which exceeds the melting point $T_k$. In other words, temperature T of thermal capacitor $C_1$ varies following the equation (1) as indicated by a curve 40 in FIG. 4 as a function of time t after having been heated to temperature $T_0$ repetitively. In FIG. 4, a hatched area 42 is the portion which contributes to melting of ink region 164.

In order to avoid complication in mathematics, the above-mentioned hatched area 42 may be approximated by a rectangular energy pulse having an amplitude $T_0$ and pulse width $t_0$ as shown to the left in FIG. 3. With this approximation, a heat flow $i_5$ which flows into the thermal resistance $R_5$ may be expressed by the following equation (2).

$$i_5 = \frac{T_0R_4 + T_pR_3}{R_2R_4 + R_4R_5 + R_3R_5} \quad (2)$$

Accordingly, the energy Q absorbed by the ink region 164 to be transferred may be approximated by the following equation (3).

$$Q \cong \int_0^{t_0} i_5 dt = \frac{(T_0R_4 + T_pR_3)t_0}{R_2R_4 + R_4R_5 + R_3R_5} \quad (3)$$

This equation (3) may be rewritten as follows:

$$T_0 \cong \frac{Q}{R_4t_0}(R_3R_4 + R_4R_5 + R_3R_5) - \frac{R_3}{R_4}T_p \quad (4)$$

In order to apply a predetermined energy Q to the ink region 164 to be transferred irrespective of the pattern of image information and the heat storage condition of substrate 10, heat must be applied to the heat-producing element 18 to compensate the temperature difference $T_s$ at time t given by the following equation (5).

$$T_s = T_0 - T = (T_0 - T_p)(1 - \exp(-t/C_1R_1)) \quad (5)$$

$$= \left(\frac{Q(R_3R_4 + R_4R_5 + R_3R_5)}{R_4t_0} - \left(1 + \frac{R_3}{R_4}\right)T_p\right)(1 - \exp(-t/C_1R_1))$$

It is to be noted that the above equation (5) has been derived by substituting the equation (1) for T and the equation (4) for $T_0$.

Input heat energy $E_{in}$ to be supplied to the heat-producing element 18, or the thermal capacitor $C_1$, may be given by the following equation (6).

$$E_{in} = C_1T_s \quad (6)$$

Assuming the conditions that temperature $T_p$ of substrate 10 is maintained at an arbitrary reference temperature and thermal capacitance $C_1$ of heat-producing element 18 is at the temperature same as this temperature $T_p$, with $E_0$ denoting input energy required to obtain a recorded image of desired quality, the input energy condition so as to obtain recorded image information of desired quality may be expressed by the following equation (7) as derived from the above equations (5) and (6).

$$E_{in} = E_0(1 - A\Delta T_p)(1 - exp(-t/C_1R_1)) \quad (7)$$

$$A = \frac{t_0(R_3 + R_4)}{Q(R_3R_4 + R_4R_5 + R_3R_5)} \quad (8)$$

It will be appreciated that A of equation (8) is constant and $\Delta T_p$ indicates an increment of temperature from the reference temperature.

Referring now to FIG. 5, there is schematically shown a thermal recording head driving control system 100 embodying the present invention, which may be used to control the supply of activation energy to heat-producing element 18 in accordance with the above equations (7) and (8). The system 100 generally includes a pair of random access memories (RAMs) 102 and 104, shift register 106, AND gate 108, RAM 110, latch 112, counter 114, a read only memory (ROM) 116 and a latch/multiplexer 118.

In the present embodiment, the thermal recording head 10 includes a linear array of 2,048 bits or heat-producing elements provided on a substrate, and it further includes as also provided on the substrate a 2,048-bit shift register 182 and a latch 184 connected to the shift register 182 to hold the status of each of the bit information transferred from the shift register 182. As a result, one scan line includes 2,048 dots or pixels at maximum. As shown in FIG. 6, in accordance with the illustrated embodiment, one scan line time period $t_L$, which is the time required to carry out scanning from one end of the linear array to the other end, is divided into an N (positive integer) plurality of sub-periods $t_B$ in activating each of the heat-producing elements 18. As an example, the full scan line period $t_L$ is approximately 2.5 milliseconds and the sub-period $t_B$ is approximately 300 micro-seconds with N=8. Thus, in the case where a "white" dot is to be recorded on the recording medium 14, no activation pulse is supplied to the corresponding bit position of shift register 182 as indicated by numeral 322 in FIG. 6(E); on the other hand, in the case where a "black" dot is to be recorded, an n (positive integer between 1 and 8) number of activation pulses 320 such as shown by 320 in FIG. 6(E) are supplied to the corresponding bit position of shift register 182. Then, such bit information, whether black or white, is stored into the latch 184 which responds to a LOAD signal supplied once for each sub-period $t_B$, and the bit information is temporarily stored in the latch 184 during each sub-period $t_B$ so that those transistors 186 corresponding in position to the "black" bits are rendered conductive thereby allowing a driving current to flow through the corresponding heat-producing elements or resistors 18. As a result, it is equivalent in terms of supplying the total amount of activation energy to apply a single activation pulse 32 (see FIG. 6(F)) having a pulse width of $nt_B$ for full scan line time period $t_L$.

In accordance with the present embodiment, the activation time period $nt_B$ of heat-producing element 18 is determined as a percentage of full scan time period $t_L$ or ratio n/N is determined by the above equation (7) in accordance with the length of resting time period from the last preceding activation and with the temperature of substrate 10 to control the supply of activation energy to each of the heat-producing elements 18.

Each of RAMs 102 and 104 has 2K bits (2,048 bits), and input data IDATA which is image information to be recorded is supplied alternately to either one of RAMs 102 and 104 every 2K bits through a line 120 in a toggle manner. Addresses of the information stored in the RAMs 102 and 104 are designated by IADD. When either one of RAMs 102 and 104 becomes full, the data thus stored is outputted serially bit-by-bit to a line 122 and inputted into a shift register 106. The outputting speed is eight times higher than the full line scanning speed and thus the time required to output the stored data is ⅛ of the full scan time period $t_L$. Accordingly, data may be outputted eight times during the full scan time period $t_L$. Addresses of output data are designated by OADD.

FIGS. 6(A) through 6(F) show several waveforms appearing at various points in the system of FIG. 5, wherein it is to be noted that the time scales in the abscissa are the same for FIGS. 6(A), 6(C) through 6(F), but a single full scan time period $t_L$ is shown as expanded in FIG. 6(B). That is, when FIG. 6(A) image information IDATA to be recorded is inputted into either one of RAMs 102 and 104, the same image data is ouputted to the line 122 eight times repetitively. It is to be noted that in each of FIGS. 6(C) through 6(F) the left half only shows waveforms of bit 0 (or first bit) in line 0 (or first scan line) and the right half only shows waveforms of bit 0 (first bit) in line 1 (or second scan line which immediately follows the first scan line) with the waveforms for the remaining bits 1 through 2,047 being omitted from illustration. In this manner, RAMs 102 and 104 each function as a toggle buffer, and these toggle buffers are operatively controlled by a toggle buffer control 130.

A shift register 106 has its 2-bit delayed output terminal $Q_B$ connected to one input terminal 124 of AND gate 108 (see FIG. 6(C)). AND gate 108 has its other input terminal 126 connected to receive a control signal which determines the pulse width of pulse 32 (see FIG. 6(F)) which, in turn, activates the corresponding heat-producing element 18 over a duration of one bit. Such a control pulse is supplied in synchronism with each bit from the latch/multiplexer 118 (see FIG. 6(D)). The control signal may take either of two states, and when it is "true", data transfer to the thermal recording head 10 is valid; on the other hand, if it is "false", data transfer is invalid and thus data is not transferred to the recording head 10. Accordingly, as described previously, if the control signal indicates the "true" state n times during repetitive transfer of full scan line data by eight times, the activation pulse 32 has the pulse width which is equal to n/8 of full scan line time period $t_L$ (see FIG. 6(F)).

A circuit for determining the pulse width of the above-mentioned control pulse is generally formed by elements 110, 112, 114, 116 and 118 shown in FIG. 5. RAM 110 has a memory capacity of 2K×4 bits and it is addressed through an address line 132 in synchronism with a data output supplied from the above-described toggle buffer section defined in the top left portion of FIG. 5. Storage of data into RAM 110 is carried out for each bit at the last one of the before-mentioned repetitive data transfer which is implemented eight times in association with energization of WENA signal. Thus, the states of outputs $Q_A$, $Q_B$ and $Q_C$ of counter 114 are stored into an address of the corresponding bit through data lines 134.

Counter 114 is a counter which indicates the length of time elapsed from a point in time when the corresponding heat-producing element 18 has been activated for the last time by the number of full scan line time periods $t_L$ for each bit. In the present embodiment, counter 114 monitors the history of activation for each bit up to the last succeeding eight scan lines. Described more in detail, when RAM 102 or 104 is addressed by output address OADD, one bit image information data is read out eight times consecutively and transferred to the gate 108 through the shift register 106 (see FIGS. 6(B) and 6(C)). Then, in synchronism with the eighth and thus last transfer of data, the data read out of the storage position of RAM 110 which is addressed by the same address is supplied to the output lines 136 and then latched into latch 112. This data is also supplied not only to address inputs 138 of ROM 116 but also to preset inputs A, B and C of counter 114. It is to be noted that an ELCLK signal is a pixel clock signal which is supplied for each bit of image information data.

The counter 114 functions to have preset values A, B and C loaded in response to a CNTLOAD signal which is supplied in synchronism with one bit of image information data and to count a clock CNTCLK which is also associated with one bit of image information data thereby incrementing the preset values A, B and C by 1 and outputting the thus incremented values as $Q_A$, $Q_B$ and $Q_C$. These outputs are then transferred to RAM 110 through lines 134 and stored into an appropriately addressed position. This count operation takes place in response to a CNTENA signal which is associated with the last transfer operation among the eight time repeated transfer operations for each bit of image information data.

From one output $Q_A$ of shift register 106, image information data (FIG. 6(C)) which is the same as that from the other output $Q_B$ is outputted and supplied as one input 142 to NAND gate 140. If one bit of image information data to be recorded indicates a "black" dot, as shown by the bit 0 in line 0, then NAND gate 140 is energized in synchronism with signal CNTENA thereby causing the counter 114 to be reset to all 0s through a reset terminal R. Accordingly, all 0s of outputs $Q_A$, $Q_B$ and $Q_C$ are stored into an appropriate address of RAM 110. In this manner, with RAM 110 and counter 114, the history of activation for each bit of one scan line is monitored up to the last preceding eight scan lines.

ROM 116 receives address information A0–A2 regarding the resting time period t of heat-producing element 18 via lines 138 and another address information A3–A7 regarding the temperature of substrate 10, which is indicated by a THERM signal. In ROM 116 is stored a data indicating the pulse width of activation pulse 32 (FIG. 6(F)) corresponding to input energy $E_{in}$ as calculated by the above-described equation (7) at a storing position addressed by the input address information. As described before, the data indicating the pulse width of activation pulse 32 is stored as the number n of bit pulses 320 shown in FIG. 6(E) in ROM 116. It is to be noted that the THERM signal is a digital signal indicating the temperature of substrate 10, which has been converted from an analog signal obtained by using a temperature detector 22 (see FIG. 1) such as a thermister, and this signal is related to $\Delta T_p$ in equation (7).

The data indicating the number n of bit pulses is read out of ROM 116 through its output terminals Q0–Q7, and each of the outputs Q0–Q7 of ROM 116 is passed through the multiplexer 118 to its output line 126 as a MPXCK signal, which indicates either one of the eight sub-periods $t_B$ and which is supplied to the multiplexer 118, increments from 0 to 7. Thus, the output data from the multiplexer 118 is supplied to one input of AND gate 108 as a data for determining the pulse width of activation pulse 32 for each bit. It is to be noted that, as an alternative structure, such feed back of temperature of substrate 10 may be carried out for a voltage supply which supplies an applied voltage $V_{HD}$ to the heat-producing element 18.

As described above, in accordance with the present embodiment, the activation pulse 32 having the pulse width which corresponds to input energy $E_{in}$ determined by equation (7) line by line is applied to the heat-producing element 18. It is to be noted that in the above-described embodiment, during the full scan line time period $t_L$, eight bit pulses 320 at maximum may be applied for recording a "black" dot, and a selected number n (which is an integer between 1 and 8) of bit pulses 320 including the first bit pulse in a series of eight consecutive bit pulses 320 are used. However, the selection of bit pulses 320 may be made in any other appropriate manner. For example, the bit pulses 320 may be selected for use randomly or so as to include the last bit pulse. Of course, the maximum number of bit pulses 320 does not need to be limited to eight. Furthermore, it should also be noted that, in the above-described embodiment, the input activation energy to be applied to each of the heat-producing elements 18 is appropriately adjusted by controlling the number n of bit pulses 320 or the pulse width of corresponding activation pulse 32 which is applied to the base of driving transistor 186. However, the present invention should not be limited only to such a structure. Alternatively, the present invention may also be so structured to control the amplitude of activation pulse 32 or the level of driving voltage or current to be applied to the base of driving transistor 186.

Figure 7:
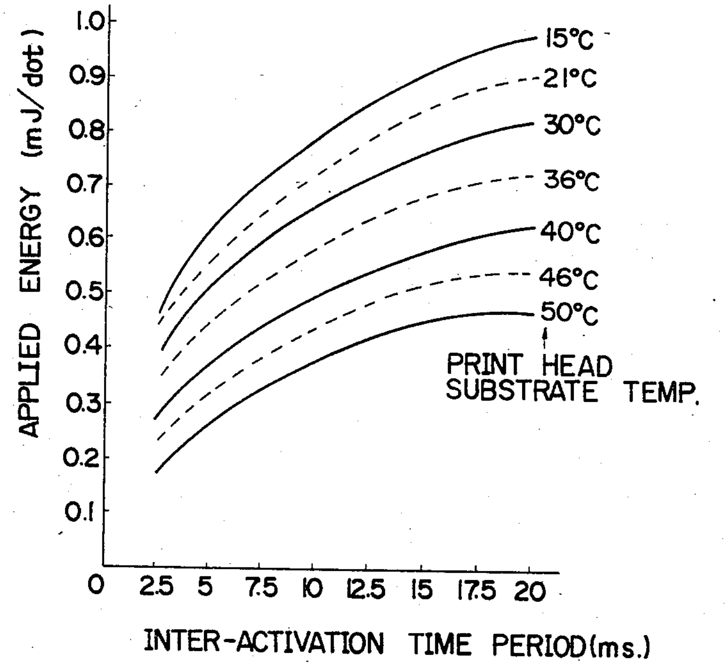
FIG. 7 is a graph showing the operating characteristics measured with respect to the system shown in FIG. 5.

Tests have been conducted using the inked sheet 16 having the melting point of 63° C. and the thermal recording head 10 having a thin-film array of 2,048 heat-producing elements and the energy applied to the heat-producing element 18 has been measured with the measured results plotted in FIG. 7. The plots of FIG. 7 generally agree with the approximate relation (7).

The above-described embodiment is the case in which the present invention has been applied to the transfer type thermal recording apparatus; however, the present invention does not need to be limited only to such an application and it may also be applied to other types of thermal recording apparatuses such as the thermosensitive type thermal recording apparatus employing thermosensitive paper as a recording medium. In the case when the present invention is applied to such thermosensitive type thermal recording apparatus, the energy for melting ink in the transfer type thermal recording apparatus is changed to a coloring energy for forming a so-called "burn" point on thermosensitive paper and thus the resistance of $R_3$ will be different.

The values of $E_0$, A and $C_1R_1$ will vary depending upon various factors such as melting point of ink in the inked sheet, sensitivity of thermosensitive paper and the structure of thermal recording head. However, if the reference temperature of substrate temperature $T_p$ is assumed to be 20° C., for the existing transfer type thermal recording system of $8\times8$ dots/mm$^2$, the preferred range of values for each of these parameters is as follows:

$$E_0=0.5-1.0\ mJ/dot$$

$$A=1.0\times10^{-2}-2.0\times10^{-2}$$

$$C_1R_1=2.0\times10^{-3}-1.0\times10^{-2}.$$

As described above, in accordance with the present invention, the heat storage condition of the heat-producing element in a thermal recording head is monitored depending upon the activation history and the current temperature of substrate, and the level of activation energy to be applied to the heat-producing element is controlled accordingly. Therefore, the present invention insures to obtain a recorded image of excellent quality at all times without being affected by the pattern of image to be recorded. Moreover, since the inter-activation time period, i.e., the time period between the two consecutive activations, may be made smaller without causing any problem, thermal recording may be carried out at high speeds. Thus, the present invention is particularly suited for applications to facsimile machines and high-speed printers.

Figure 8:
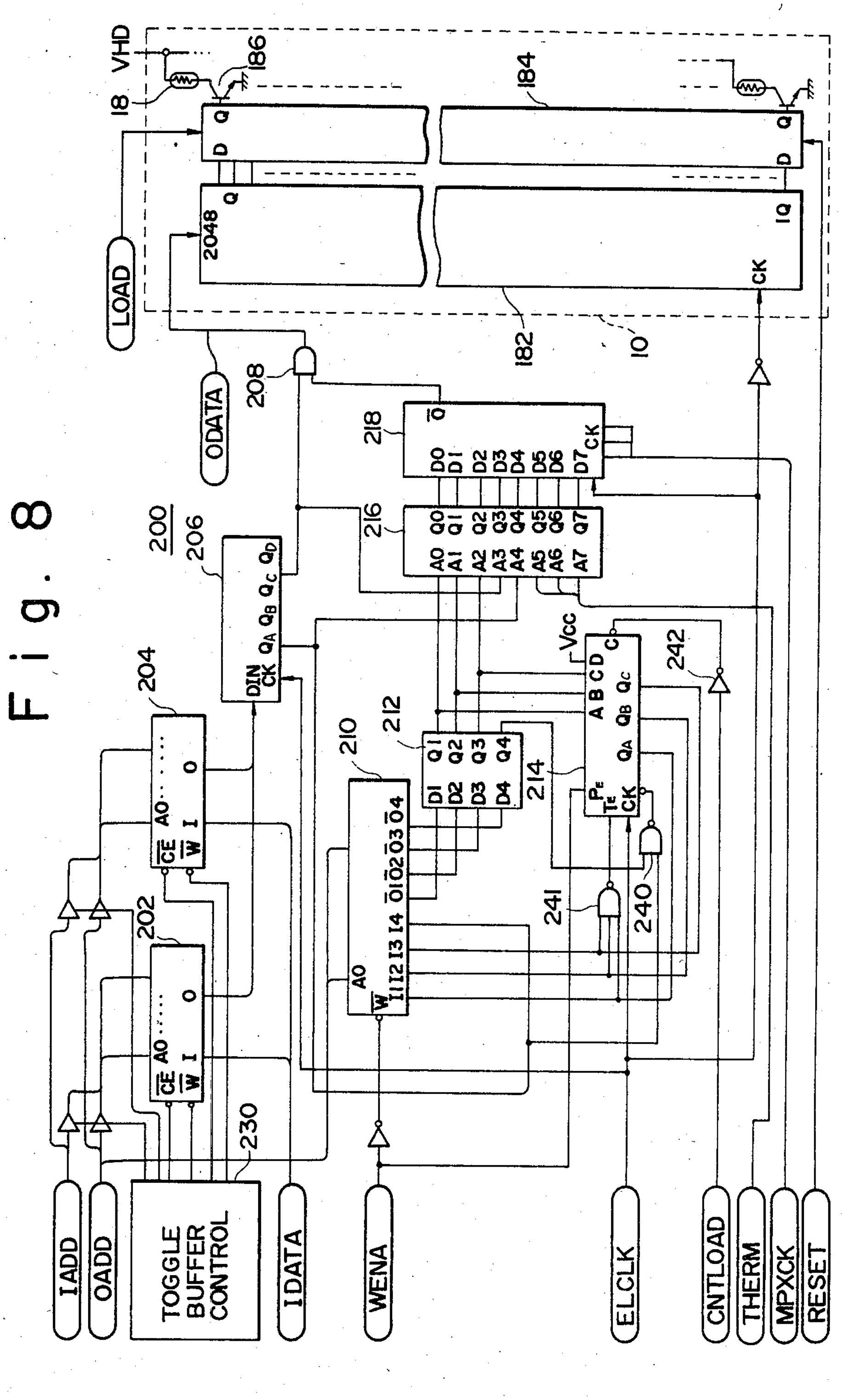
FIG. 8 is a schematic illustration showing the thermal recording head driving control system constructed in accordance with another embodiment of the present invention.

Referring now to FIG. 8, there is shown another embodiment 200 of the present invention. The thermal recording head driving control system of FIG. 8 is structurally similar to the previous system of FIG. 5 in many respects. As shown, the thermal recording head driving control system 200 generally comprises a toggle buffer section including a pair of RAMs 202 and 204 and a toggle buffer control 230 connected to receive input image data, a shift register 206 connected to receive data from the toggle buffer section, an AND gate 208 having its one input terminal connected to receive data from the shift register 206 and its output terminal connected to the 2,048-bit shift register 182 of thermal recording head 10, and an activation time period control section generally including a RAM 210, a latch 212, a counter 214, a ROM 216 and a multiplexer 218, the activation time period control section receiving input image data to be recorded from the toggle buffer section and the temperature data indicating the current temperature of thermal recording head, particularly its substrate, and controlling the pulse width, or activation time period, of an activation pulse to be applied to the corresponding driving transistor 186.

Similarly with the above-described previous embodiment, in the driving control system 200 of FIG. 8, a full scan line contains 2K bits (2,048 bits) of image data and the data of full scan line are outputted eight times repetitively. And, the pulse width indicating the activation time period of an activation pulse to be applied for each of heat-producing elements 18 arranged in the form of a linear array is appropriately determined under control based on 8-bit pulse width control information including (1) three bits of information for indicating the activation history during a time period equivalent to scanning of eight full scan lines for each heat-producing element, (2) two bits of information for indicating the recording conditions on both sides (right and left) for each heat-producing element, and (3) three bits of information for indicating the current heat storage condition (temperature condition) of thermal recording head, particularly its substrate.

In operation, input image data to be recorded IDATA is inputted into either one of RAMs 202 and 204 in a toggle manner under the control of a toggle buffer control 230. When one of the RAMs 202 and 204 becomes full, the data contained therein is outputted at a speed eight times higher than the line scanning speed of the recording head 10 and supplied into the shift register 206 serially. Thus, the supply of image data from the RAM 202 or 204 depending on which is in operation to the shift register 206 takes place eight times during a single line scanning operation. IADD signifies input address and OADD signifies output address. The data transferred into the shift register 206 is outputted from its output terminal $Q_C$ after a 3-bit delay and supplied to one input terminal of an AND gate 208, the other input terminal is connected to receive a pulse width control data which regulates the pulse width of an activation pulse to be applied to the driving transistor 186 and thus the activation time period of each of the heat-producing elements 186. Thus, when the control signal supplied to the other input terminal of AND gate 208 indicates "true", transfer of image data to the thermal recording head 10 is rendered valid; whereas, when the control signal (pulse width control data) indicates "false", then the transfer of data is rendered invalid, whereby no image data is supplied to the head 10.

RAM 210 in the activation time period control section has a capacity of 2K×4 bits and it is addressed in synchronism with the speed of data outputted from the toggle buffer section. Inputting of data into RAM 210 takes place during the first round of data transfer operation which is repeated eight times. That is, 1-bit delayed data is inputted into the fourth input pin I4 of RAM 210 from the shift register 206. This is because, although the data supplied to the recording head 10 is delayed by 3 bits, since a 2-bit delay is produced before appearing at the output terminal of multiplexer 218, a 2-bit delayed data is inputted into RAM 210 so as to keep overall synchronism.

In the case where input data into RAM 210 (4th pin) indicates "true" and the data in the last preceding line also indicates "true", the counter 214 is reset by an output signal from an AND gate 240. On the other hand, if the data indicates "false", the count in the counter 214 is incremented. If the count of counter 214 reaches "8", then all the values of $Q_A$, $Q_B$ and $Q_C$ become "true" so that the counting operation is halted by an output signal supplied from an AND gate 241. An output data from the counter 214 is also inputted into RAM 210 thereby constituting a data indicating the activation history of each heat-producing element 18. That is, RAM 210 stores information as to which of the heat-producing elements 18 has been activated over the eight last preceding scan lines, and when a data indicating "true" is inputted, RAM 210 supplies this information to input pins A0–A2 of ROM 216. It is to be noted that the above-described embodiment is the case of continuous recording; on the other hand, in the case of intermittent recording as in the case of facsimile machines, the incremental operation of counter 214 is not implemented on a line-by-line basis but rather on a unit time basis thereby storing the activation history in terms of time.

ROM 216 receives at its fourth and fifth input pins (A3 and A4) data outputted from output terminals $Q_A$ and $Q_C$ of shift register 206, which are the data to be applied to the two adjacent heat-producing elements 18 on both sides of a particular heat-producing element 18. In reality, these data correspond to the data at $Q_B$ and $Q_D$, however, since there will be produced a 1-bit delay due to latching operation into the multiplexer 218, the data at $Q_A$ and $Q_C$ are supplied. ROM 216 also receives at its input pins A5–A7 a THERM signal indicating the current temperature of the recording head substrate. As described in detail before, ROM 216 contains a table which allows to determine the activation time period or pulse width of an activation pulse to be applied to the driving transistor 186 on the basis of (1) information as to the activation history over the last preceding 8 scan lines and (2) information as to the current temperature condition of the recording head substrate for each of the recording bits or heat-producing elements 18. Thus, in response to an 8-bit input data supplied at its input pins A0–A7, ROM 216 supplies as its output a pulse width control data as one input to AND gate 208.

Figure 9:
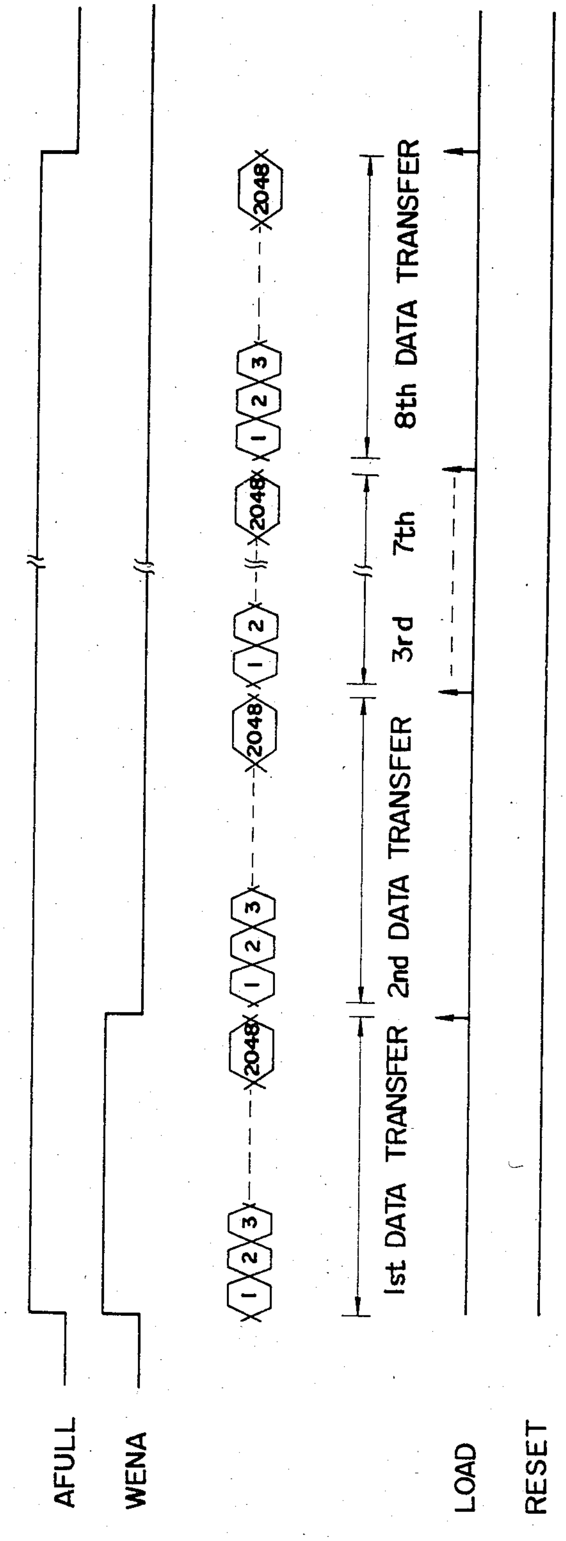
FIG. 9 is a timing chart which is useful for understanding the operation of the system shown in FIG. 8.

The above-described operation takes place during the first round of the eight time repeated data transfer operations, i.e., during the time while WENA indicates "true". Thus, during the first data transfer operation, all of the data are set "true" (output Q0 of ROM 216 is always "true"). The multiplexer 218 receives a clock signal MPXCLK and it selectively passes one bit of 8-bit output from ROM 216 depending upon the number of data transfer operations and the thus passed data is supplied as one input data to AND gate 208, whose output data is then supplied into the shift register 182 having 2,048 bits serially. Upon completion of nth data transfer operation, its data is latched into the latch 184 in association with a LOAD signal and this data is used for recording until the next LOAD signal is inputted. Then, upon completion of 8th latch operation and after elapsing the time period of one data transfer operation, a RESET signal is applied to have the latched data all reset, thereby completing the recording of one scan line. The above-described operation will be better understood if reference is made to the timing diagram of FIG. 9.

Incidentally, if the data transfer speed is not fast enough due, for example, to limitations imposed by a particular device used, it may be so structured that data is inputted in parallel.

Figure 10:
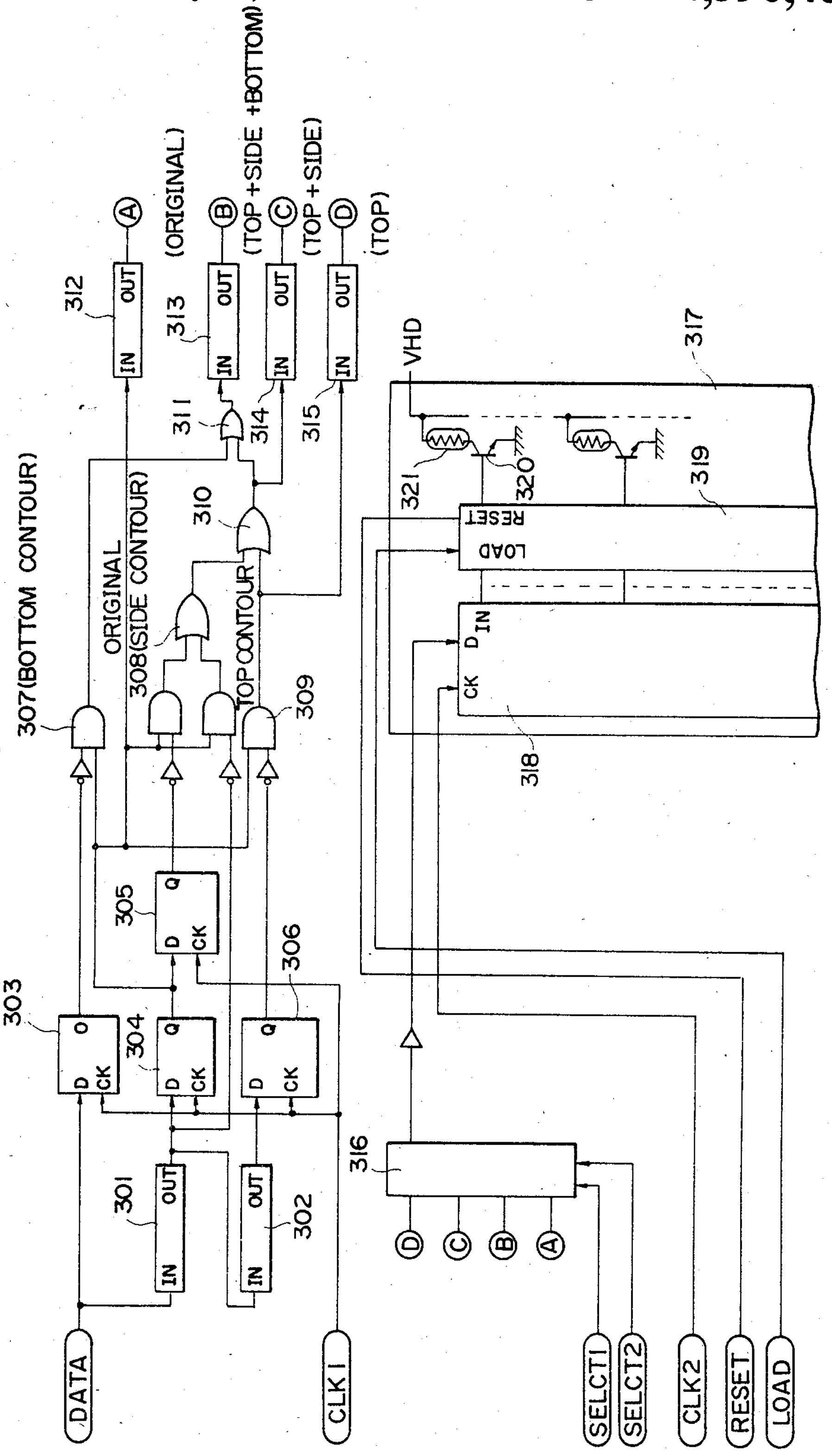
FIG. 10 is a schematic illustration showing the thermal recording head driving control system constructed in accordance with a further embodiment of the present invention.

FIG. 10 illustrates a further embodiment of the present invention and there is shown a thermal recording head driving control system for controlling the operation of a thermal recording head 317 provided with a linear array of 2,048 heat-producing elements 321. As shown in FIG. 10, an image data DATA to be recorded is inputted into a one-line shift register 301 and its associated output data is inputted into another one-line shift register 302. Such a dual structure is to define two consecutive lines of data to be recorded. Flipflops 303–306 are provided for delaying the data by one bit thereby defining two adjacent bits on both sides of a particular bit in a particular scan line. Assuming that a sheet of recording medium is driven to move upward, or from the bottom to the top, if the flipflop 304 supplies the unprocessed original data as its output, an AND gate 307 will supply as its output a data as to the bottom contour of image information and an OR gate 308 will supply as its output a data relating to the side contour of image information with an AND gate 309 supplying as its output a data relating to the top contour of image information. The top contour data and side contour data are logically summed at an OR gate 310, whose output is logically summed with the bottom contour data at another OR gate 311. These data are respectively stored into four one-line RAMs 312, 313, 314 and 315, as shown. That is, the RAM 312 receives all of the image information (original uncooked data) and the RAM 313 receives the logically summed data of top, side and bottom contour data of image information. On the other hand, the RAM 314 receives the logically summed data of top and side contour data of image information and the RAM 315 receives a logically summed data of top contour data of image information.

Upon completion of inputting of data into the RAMs 312–315, recording operation follows. Outputs A, B, C and D from RAMs 312–315 are selected by a selector 316 in response to selection signals SELCT1 and SELCT2. Similarly with the previously described embodiments, the thermal recording head 317 includes a one-line shift register 318 having 2,048 bits, a latch 319 associated with the shift register 318, a plurality (2,048) of driver transistors 320 connected to the corresponding bits of latch 319 and a like plurality (2,048) of heat-producing elements 321, such as electrical resistors, each connected to the corresponding driver transistor 320.

Figure 11:
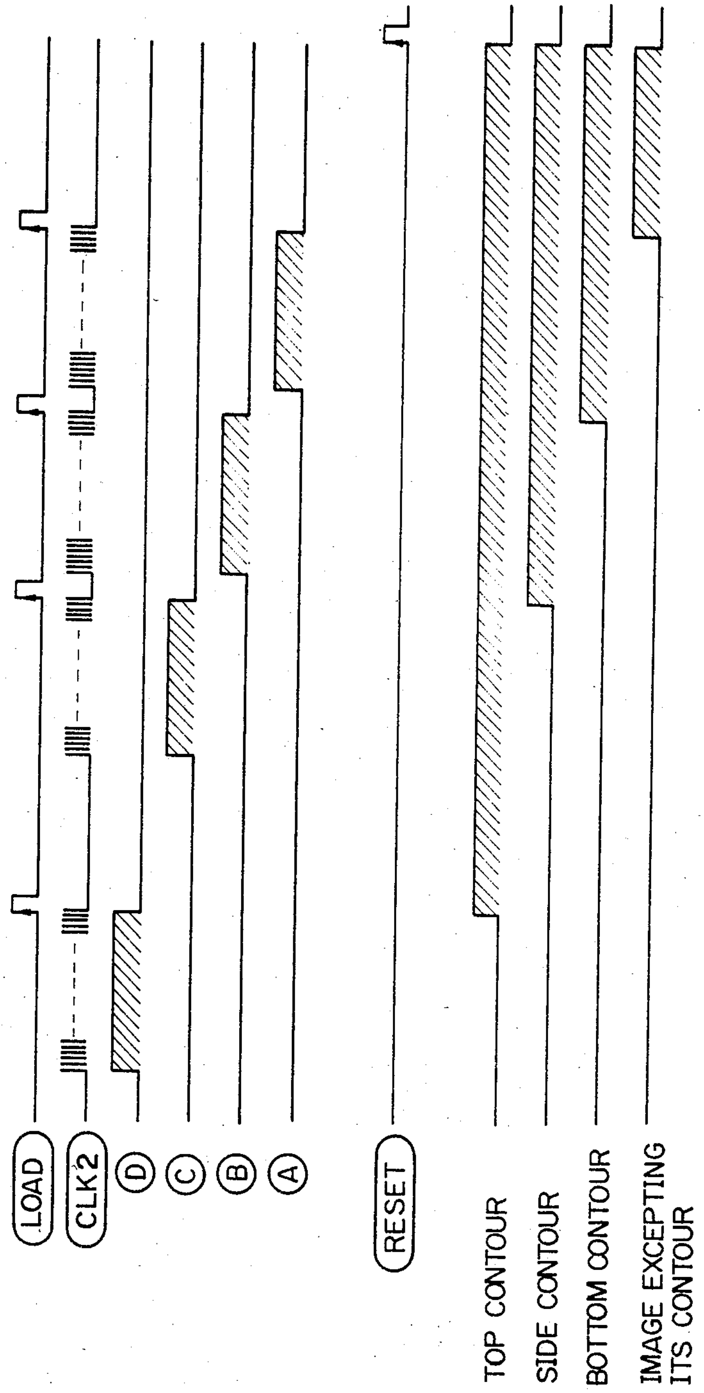
FIG. 11 is a timing chart which is useful for understanding the operation of the system shown in FIG. 10.

FIG. 11 illustrates the timing diagram showing the relation between transfer of data and activation of each element. The data transfer clock CLK2 is fast enough to allow transfer of one line data within spacing of control accuracy of activation pulse width.

In the first place, top contour data D is transferred. Upon completion of this transfer, a LOAD signal is applied to have the data latched into the latch 319, and, at the same time, the heat-producing elements 321 are selectively activated in accordance with the top contour data. Then, top+side contour data C is transferred and latched, which is followed by selective activation of heat-producing elements 321 according to data C. Similarly, top+side+bottom contour data B and then the total image information A are transferred, latched and used for selective activation of elements 321 according to these data, respectively. Finally, a RESET signal is applied to cease the recording operation. The pulse width of each of activation pulses for contour and internal image data is illustrated in FIG. 11, and the pulse width may be adjusted by changing the timing of application of the LOAD signal.

It is to be noted that for the bottom contour, the same level of activation energy as that of the internal image may be applied. However, when the heat stored in the thermal recording head becomes significant and thus it becomes necessary to lower the total amount of energy to be applied, it is preferable that the level of activation energy to be applied to the internal image data is decreased to lower the overall input amount of energy and yet the level of activation energy to be applied to the bottom contour may be controlled so as to properly record the contour portion thereby allowing to maintain the overall quality of recorded image high.

As described above, in accordance with this embodiment of the invention, the contour portion of image information is examined and the image information is dissected into top contour, side contour, bottom contour and internal portions. Then, the level of activation energy to be applied to each of a linear array of heat-producing elements is controlled separately for each of the image portions thus dissected. Therefore, it allows to obtain a recorded image of excellent quality at all times without being adversely affected by heat storage in the thermal recording head, particularly its substrate, and the heat dissipating condition during recording.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A system for controlling the activation of a heat-producing element mounted on a substrate of a thermal recording head, comprising:

detecting means for detecting the temperature of said substrate;

first storing means for temporarily storing image data in the form of a binary number to be recorded;

pulse forming means connected to receive said image data from said first storing means for forming an activation pulse to be applied to said heat-producing element for activation thereof, said activation pulse being indicative of the level of activation energy to be supplied to said heat-producing element when activated; and control means connected to said pulse forming means for controlling the level of activation energy of said activation pulse formed by said pulse forming means in response to a temperature signal indicating the temperature of said substrate supplied from said detecting means and said image data supplied from said first storing means, said control means including measuring means for measuring an elapsing time t after the last preceding activation of said heat-producing element, wherein said control means controls the energy level $E_{in}$ of said activation pulse according to the following relation;

$$E_{in}=E_0(1-A\Delta T_p)(1-exp(-t/C_1R_1))$$

where, $C_1$: thermal capacity of said heat-producing element, $R_1$: thermal resistance from said heat-producing element to said substrate, $E_0$: energy level required to obtain a recorded image of desired quality when said substrate is at a reference temperature, A: constant, and $\Delta T_p$: temperature difference from said reference temperature.

2. A system of claim 1 wherein said heat-producing element is an electrical resistor and said activation pulse is an electric current pulse to be passed through said element, whereby heat is produced due to Joule heating.

3. A system of claim 2 wherein said control means controlling the pulse width of said current pulse for controlling the energy level to be applied to said resistor.

4. A system of claim 1 wherein said thermal recording head includes a plurality of said heat-producing elements mounted on said substrate in the form of a linear array, and said first storing means is capable of storing like plurality of bits of image data.

5. A system of claim 4 wherein said first storing means includes a shift register having said plurality of bits.

6. A system of claim 5 wherein said pulse forming means includes an AND gate having its first input terminal connected to receive said bits of image data from said shift register serially, its second input terminal connected to receive a control signal from said control means and its output terminal connected to said thermal recording head, whereby the passage of said bits of image data through said AND gate is controlled by said control signal.

7. A system of claim 6 further comprising second storing means for temporarily storing said image data prior to transfer to said shift register.

8. A system of claim 7 wherein said second storing means includes a pair of random access memories (RAMs) which are used to store said image data in a toggle manner, each of said RAMs being capable of transferring said image data more than once to said shift register during a single line scanning of said array of heat-producing elements.

9. A system of claim 8 wherein said control means includes third storing means for storing the activation history of each of said heat-producing elements.

10. A system of claim 9 wherein said third storing means store the activation history of each of said heat-producing elements for a predetermined number of last preceding scan lines, and said control means further includes renewing means for renewing said activation history each time when another scan line is recorded.

11. A thermal recording system comprising;

a substrate;

a plurality of heat-producing elements arranged in the form of an array as mounted on said substrate;

pulse forming means for forming energy pulses to be applied to said plurality of heat-producing elements on the basis of image data of a predetermined number of bits to be recorded, said pulse forming means forming said energy pulses more than once for the same image data;

a shift register having like plurality of bits for receiving said energy pulses;

a latch having like plurality of bits and connected to receive said energy pulses from said shift register, each bit of said latch being connected to the corresponding one of said plurality of heat-producing elements, whereby said energy pulses formed by said pulse forming means are applied to said plurality of heat-producing elements more than once.

12. A system of claim 11 wherein each bit of said image data has either one of the two binary states and said pulse forming means forms said energy pulse upon encounter of a predetermined one state of said binary image data.

13. A system of claim 12 wherein said pulse forming means includes control means for controlling the formation of said energy pulse depending upon the temperature of said substrate and the activation history of each of said plurality of heat-producing elements.

* * * * *